Patented Mar. 9, 1943

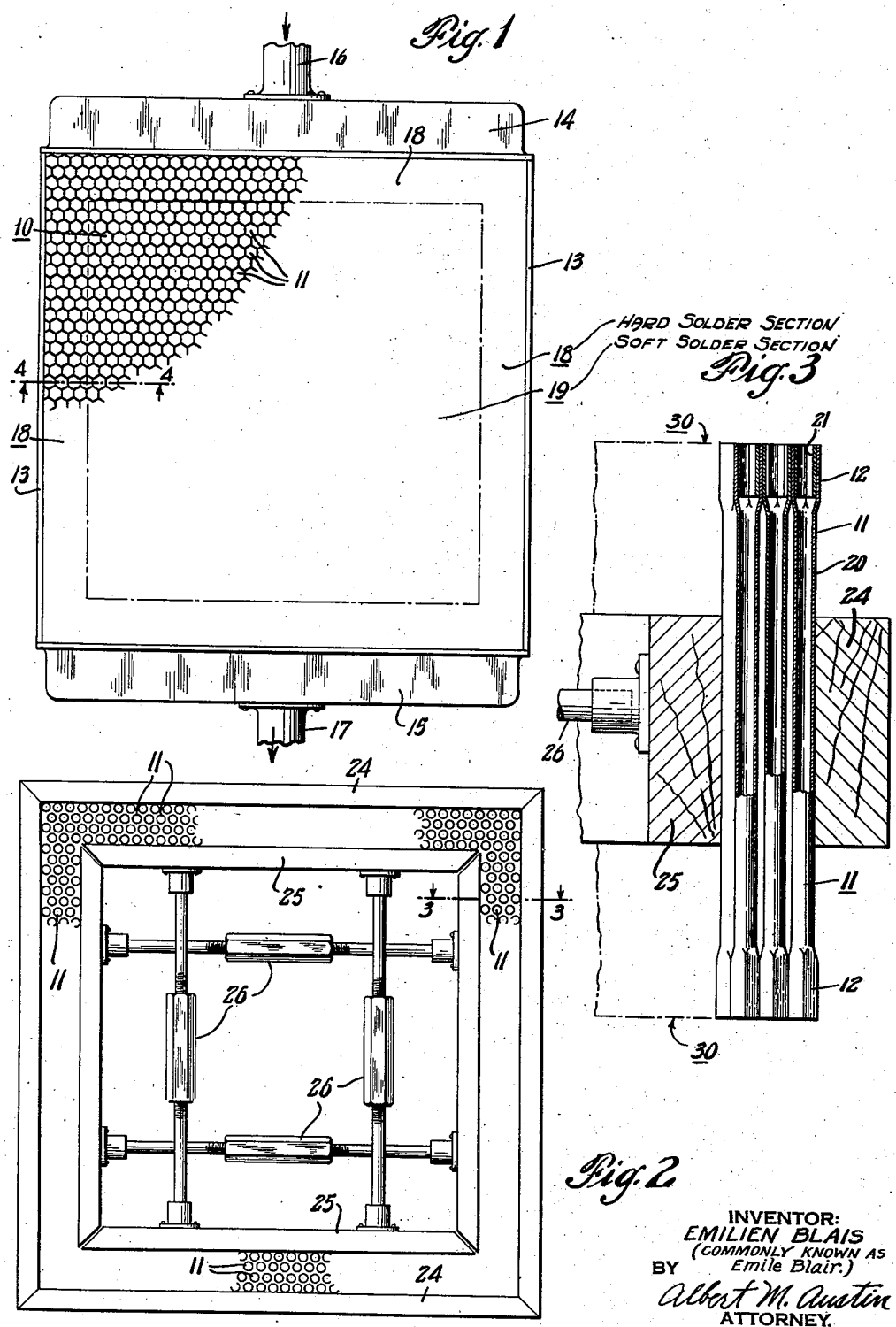

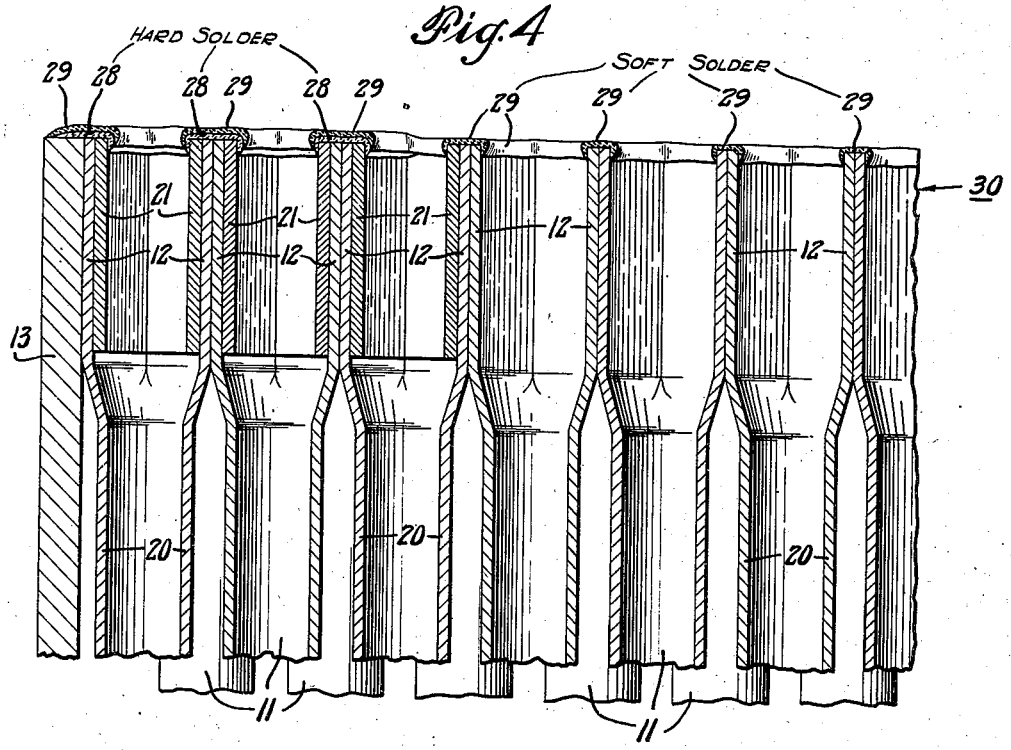
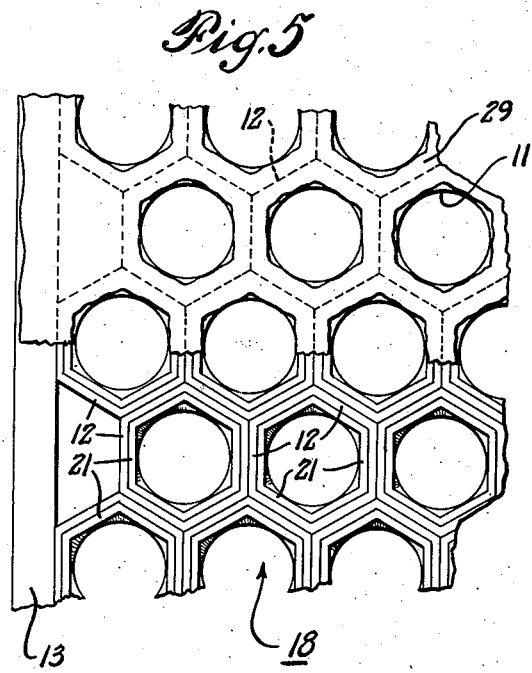
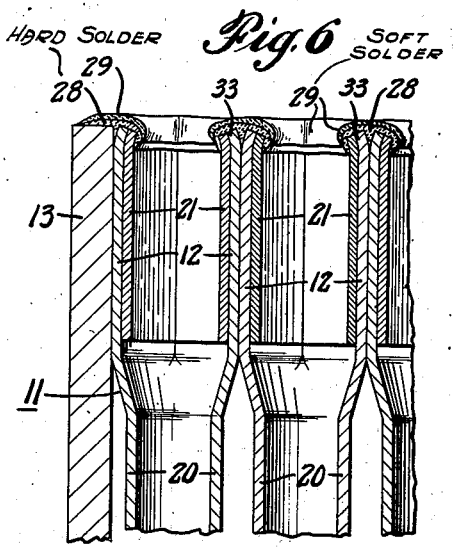

2,313,315

UNITED STATES PATENT OFFICE 2,313,315

COMPOSITE SOLDERED HEAT EXCHANGER

Emilien Blais, commonly known as Emile Blair, New Haven, Conn., assignor to Western Cartridge Company, New Haven, Conn., a corporation of Delaware Application May 3, 1941, Serial No. 391,698

3 Claims. (Cl. 257—128)

The invention relates in general to heat exchangers, and more particularly to a heat exchanger of the cartridge type having great mechanical strength and efficiency and light weight.

Heat exchangers of the cartridge type are characterized by being made up of a large number of rows of small tubes having enlarged ends suitably stacked or nested together. The enlarged ends are suitably connected together by solder, either with or without spacers, forming built-up headers. The enlargements serve to space the intermediate portions of the tubes apart to permit a fluid to flow around the tubes transversely of their lengths in heat exchange relation with another fluid passing through the tubes.

Heat exchangers of the cartridge type have long been in successful commercial use as, for example, in radiators of automobiles. The ordinary commercial solder, sometimes called common solder, lead-tin solder or soft solder, used for bonding the enlarged tube ends together has sufficient strength for ordinary use. The usual manner of making these radiators is to assemble the tubes together in suitable frame and dip the ends of the assembled tubes bodily into a bath of solder maintained at sufficiently high temperature to keep the bath molten. This temperature will run for example, 725° F., depending upon the particular composition of the solder but well below any temperature which might burn or anneal the copper tubes.

For certain work, particularly in airplanes, where the radiator or heat exchanger is subject to severe vibration and where it is not permitted to make the parts heavier to obtain increased strength, the ordinary soft solder cartridge type radiators have not given satisfactory service. The soft solder has so little mechanical strength that cracks develop, causing leaks and the heat exchanger is shortly rendered unfit for service.

In order to strengthen cartridge type heat exchangers I have proposed, in application Serial No. 211,979, filed June 6, 1938, to use a solder having higher mechanical strength. Such a solder is found in the so-called silver solders which are classified as hard solders. Such a heat exchanger, while very satisfactory, overcoming all of the difficulties of the soft solder type, has the disadvantage of being difficult to manufacture. One of the reasons for the difficulty is that the hard solder has such a high melting point that, unless great care is taken, the tubes which have extremely thin wall thickness are burned or annealed, seriously impairing the strength of the heat exchanger. Because of the high melting point of silver solder it has been impractical to immerse the assembled tubes into a molten bath of the solder, but it has been necessary to apply the hard solder by hand, using a high temperature blow torch, as, for example, an acetylene torch, and applying the solder by melting a thin wire or rod of the solder with suitable flux and separately bonding each tube to its adjacent tubes. Even here great care has to be taken to prevent damaging the tubes, heat absorbing bushings being provided within the enlarged tube ends to protect the tube walls from the intense heat.

According to the present invention I provide a novel method of manufacture and an entirely new heat exchanger construction, overcoming, to a great extent, the disadvantages due to the hard solder, while retaining all of its advantages. I have found that sufficient mechanical strength can be obtained by silver soldering only the marginal rows of tubes after which the entire radiator may be dipped in the old fashioned soft solder, which not only bonds the interior tubes but also adds additional bonding material to the marginal tubes. This construction not only eliminates the tedious hand soldering of the greater part of the tubes, but provides a hard soldered peripheral or marginal sleeve or cylinder of substantial thickness having great mechanical strength against the various stresses to which light weight airplane radiators are subjected.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 illustrates somewhat diagrammatically one form of heat exchanger according to the invention.

Fig. 2 illustrates frames for assembling the marginal hard soldered rows of tubes.

Fig. 3 is an enlarged section taken through line 3—3 of Fig. 2.

Fig. 4 is an enlarged fragmentary section taken through the completed heat exchanger.

Fig. 5 is a fragmentary enlarged end view, illustrating the appearance of the completed heat exchanger; and Fig. 6 is an enlarged section illustrating a modified construction.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Fig. 1, a particular type of radiator is shown for purposes of illustration but it will be understood that the present invention is applicable to many other different types of heat exchangers.

The heat exchanger comprises in general a core 10 made up of a plurality of rows of heat exchanger tubes 11 having enlarged hexed ends 12 suitably stacked together as indicated. The enlarged ends are suitably bonded together by fusible bonding material forming built-up headers 30 as hereinafter described more in detail. The side plates 13 which may be flat as indicated, or suitably corrugated to fit the tubes, are also bonded to the core 10 by the fusible bonding material. Also bonded to the core and to the side plates 13 are duct members 14 and 15 to which are connected inlet pipe 16 and outlet pipe 17, as will be understood by those skilled in the art.

It will be understood that one fluid as, for example, water or other cooling liquid in the case of liquid cooled airplane engines, is introduced into the conduit 16, this liquid flowing around the outsides of the bodies of the tubes 11 and leaving the heat exchanger by way of conduit 17, the flow being indicated by the arrows. The other cooling fluid, which may be air, passes through the insides of the tubes 11, longitudinally thereof, in a direction perpendicular to the plane of the drawing.

It will be seen from Fig. 1 that the core 10 is divided into two areas, an outer area indicated by 18 which may be called the core shell or frame, this area constituting about four rows of tubes around the entire margin of the heat exchanger; and an inner area indicated by 19 which may be called the core interior, this comprising the remaining tubes of the core. The hexed ends 12 of the outer area 18 are provided with hexed heat absorbing bushings 21 for a purpose hereinafter disclosed more in detail. The bushings 21 and hexed ends 12 of the area 18, are bonded to each other and to the adjacent side plates 13 and ducts 14 by hard solder indicated by 28 in Fig. 4 and a superimposed layer of soft solder indicated by 29. The hexed ends of the tubes forming the core interior 19 are bonded together only by soft solder indicated by 29. It will be noted that the tubes of the core interior 19 do not have any heat absorbing bushings 21. It will be understood that the heat absorbing bushings 21 in some cases may also be omitted from the tubes making up the core shell 18.

The following is given as one example of the method of assembling the present heat exchanger: referring now to Figs. 2 and 3 an outer fixed frame 24 is provided and also an inner expansible frame 25 having expandable turn buckles 26. The rows of tubes 11 to form the core shell 18 are stacked between the frames 24 and 25, as indicated in Fig. 2, the frames being arranged to accommodate the desired number of rows of tubes for the core shell or frame 18. It will be noted that the frames 24 and 25 fit against the tube bodies 20, leaving the hexed ends 12 free for the soldering operations hereinafter set forth. The turn buckles 26 will be turned to cause the tubes to snugly nest together after which the hard solder 28 will be applied to the enlarged ends.

The silver soldering operation is a hand operation since the silver solder has such a high fusing temperature that it is difficult, if not impossible, to dip the assembled tube ends in a bath of the hard solder. In case bushings are used the hexed bushings 21 will be inserted in the tubes making up the core shell 18 and the hand soldering operation will begin. The silver solder 28 is applied by acetylene blow torch from a wire or rod of silver solder, each joint between each tube and bushing being separately soldered, suitable flux being used. The copper tubes, being extremely thin for lightness and for good heat transfer, would be burned or at least annealed by the high temperatures necessary to melt the hard solder if some heat absorbing means were not provided as, for example, the bushings 21 shown in the drawings.

After both ends of the tubes are hard soldered, the frames 24 and 25 may be removed and the side plates 13 and duct members 14 and 15 may be hard soldered to the core shell 18. In cases where the flux leaves a residue around the outsides of the tube bodies this will be blown or washed out before adding the core interior 19.

The core interior 19 may now be built up, the necessary rows of nested tubes 11 being placed in position within the core shell or frame 18, these additional rows being held in position by friction or in any other way well known in the art. The tubes 11, forming the core interior 19, do not have bushings but are otherwise identical with the tubes forming the shell 18. The entire assembled and completed core is then partially immersed in a molten bath of soft solder to connect the ends of the tubes, the soft solder indicated by 29 in Fig. 4 adhering directly to the interior tube ends and to the hard solder 28 connecting the marginal tubes and the side plates 13 and duct members 14 as indicated.

In some cases, in order to improve the bonding connection between the tubes, the extreme ends thereof may be bent inwardly as indicated by 33 in Fig. 6, the other reference characters indicating the same parts as in the other figures. This inward bending may be applied either to those tubes having bushings and to those tubes without bushings to provide increased area of contact between the several bonding materials and the tubes.

It should be noted that the indications of solder 28, 29 in Figs. 4 and 6 are largely diagrammatic, no attempt being made to show exactly how far the solder runs down into or between the tubes.

Although the radiator according to the invention may vary widely in its various dimensions, the following is given as an illustrative example of a commercial embodiment used for cooling liquid cooled airplane engines. The individual tubes have an overall length of 7⅜ inches, the axial length of the hexes on each end being ½ inch each. The outside diameter of the circular part of the tube is .210 inch and the wall thickness is .006 inch. The tube is of seamless oxygen free copper. The outside dimension from one flat hex surface to the opposite flat hex surface is .240 inch. The heat exchanger has 65 rows of tubes with 75 tubes in a row, making a total of approximately 4875 tubes. Four rows of tubes on all sides are silver soldered. Such a core will have a dimension of approximately 8 inches in length (longitudinally of the tubes), a width of approximately 20 inches, a height of approximately 14 inches.

The heat absorbing bushings may also be of substantially pure copper but of somewhat heavier stock than that of the tubes. The bushings may have a wall thickness of, for example, .015 inch.

Although various types of hard solder may be used so long as the fusing point thereof is not sufficiently high to burn or anneal the tubes, the so-called silver solders are particularly applicable. While any of the classes of the United States Government specifications for silver solder may be used, class 4 has proven to be particularly well adapted for this use in practice. Class 4 silver solder has approximately the following composition: 50% silver, 15% copper, 16% zinc, 18% cadmium. It has a melting point of from 1150 to 1170° F. It will be seen that the melting point of this silver solder is substantially below the melting point of copper, which is around 2000° F. but that the fusing point of this silver solder runs very close to the temperatures which may result in serious annealing of the hardened copper tubes. Thus it will be seen why it is necessary to exercise great care in the silver soldering operation. The melting point of silver solder is high in contrast to the melting point of ordinary lead-tin solder which ordinarily would run around 500° F.

Thus, a radiator or heat exchanger composite core is provided which has substantially as much strength as if the entire core were hard soldered, while the great labor of hand soldering is greatly reduced. When as many as 5,000 tubes for example may be used in a single radiator, the saving in labor is appreciable. The hard soldered marginal rows provide in effect a shell or frame which is continuous in peripheral extent and which provides an extremely rigid construction for resisting bending, torsional and vibrational stresses. Thus, the peripheral or marginal tubes which are most effective in resisting these stresses protect the core interior which is relatively ineffective in resisting these stresses and a heat exchanger is obtained which is practically as strong as an all-hand solder type while requiring only a fraction of the work of manufacture. Thus those tubes which are most advantageously situated are bonded with the strongest material.

While certain novel features of the invention have been disclosed and are pointed out in the annexed claims, it will be understood that various omissions, substitutions and changes may be made by those skilled in the art without departing from the spirit of the invention.

What I claim is:

1. In a heat exchanger of the cartridge type, a core having its main heat transfer portion made up exclusively of a plurality of similar tubes having enlarged ends spacing the body portions apart, fusible bonding material connecting said enlarged ends to form built-up headers, said headers being divided into a straight sided marginal portion and an interior portion, the bonding material in said marginal portion being hard solder, the bonding material in said interior portion being soft solder, said marginal portion extending continuously around the core and providing a strengthening frame or shell.

2. In a heat exchanger of the cartridge type, a core having its main heat transfer portion made up exclusively of a plurality of similar thin-walled tubes having enlarged ends spacing the body portions apart, relatively thick-walled, heat absorbing bushings disposed within the enlarged ends of marginal rows of tubes, hard solder connecting the enlarged tube ends of said marginal rows, soft solder connecting the enlarged tube ends of the tubes within said marginal rows, said enlarged ends and said solders constituting built-up headers, said marginal rows provided a strengthening frame or shell for the heat exchanger core.

3. In a heat exchanger of the cartridge type, a core having its main heat transfer portion made up exclusively of a plurality of similar thin-walled copper tubes arranged successively in substantially parallel rows to define passage for one fluid therethrough, said tubes having enlarged ends spacing the body portions apart to provide space for a passage of another fluid around the tubes, relatively thick-walled, heat-absorbing bushings disposed within the enlarged ends of marginal rows of said tubes, bonding means including silver solder connecting the enlarged ends of the tubes of said marginal rows, means including lead-tin solder connecting the ends of the tubes lying within said marginal rows, said enlarged ends and said bonding means constituting built-up headers, said marginal rows providing a strengthening frame or shell for the heat exchanger core.

EMILIEN BLAIS,
*Commonly Known as Emile Blair.*